US 6,714,379 B1

(12) United States Patent
Thompson et al.

(10) Patent No.: US 6,714,379 B1
(45) Date of Patent: Mar. 30, 2004

(54) TOP COVER SHROUD FOR A DISC DRIVE (75) Inventors: Richard Kendle Thompson, Longmont, CO (US); Aaron Steve MacPherson, Fort Collins, CO (US); Robert A. Alt, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 71 days.

(21) Appl. No.: 09/689,562

(22) Filed: Oct. 12, 2000

Related U.S. Application Data
(60) Provisional application No. 60/158,847, filed on Oct. 12, 1999.

(51) Int. Cl.⁷ .......................... G11B 33/14; G11B 17/02
(52) U.S. Cl. .................................................. 360/97.02
(58) Field of Search ........................ 360/97.02, 97.03, 360/105, 254, 133; 369/291, 269; 206/444, 309, 261; G11B 33/14, 23/02, 25/04

(56) References Cited

U.S. PATENT DOCUMENTS

| | | | | |
|---|---|---|---|---|
| 3,839,734 A | * | 10/1974 | George et al. | 360/97.02 |
| 4,249,221 A | * | 2/1981 | Cox et al. | 360/97.02 |
| 4,363,057 A | * | 12/1982 | Siverling et al. | 360/98 |
| 4,583,213 A | * | 4/1986 | Bracken et al. | 369/261 |
| 4,587,645 A | * | 5/1986 | Wong et al. | 369/75.1 |
| 5,101,305 A | * | 3/1992 | Ohkita et al. | 360/97.02 |
| 5,526,203 A | * | 6/1996 | Mohajerani et al. | 360/97.02 |
| 5,631,787 A | * | 5/1997 | Huang et al. | 360/97.02 |
| 5,677,811 A | * | 10/1997 | Kuno et al. | 360/97.01 |
| 6,034,841 A | * | 3/2000 | Albrecht et al. | 360/97.01 |
| 6,091,576 A | * | 7/2000 | Eckerd et al. | 360/254.8 |
| 6,128,151 A | * | 10/2000 | Ma et al. | 360/69 |
| 6,256,165 B1 | * | 7/2001 | Kim | 360/97.01 |
| 6,308,961 B1 | * | 10/2001 | Kunikane et al. | 360/97.02 |

* cited by examiner

*Primary Examiner*—George J. Letscher
*Assistant Examiner*—Christopher R Beacham
(74) *Attorney, Agent, or Firm*—Merchant & Gould P.C.

(57) ABSTRACT

A shroud feature and method for incorporating an airflow shroud feature in a disc drive assembly. The airflow shroud feature is connected to the cover of the disc drive rather than the base plate. When the disc drive cover incorporating the shroud feature is placed on the disc drive, the shroud feature surrounds at least a portion of the circumference of the outer peripheral surface of the disc to reduce turbulence when the disc is operated. The shroud is rigidly connected to the top cover by engagement of the shroud with a physical feature of the top cover. The shroud operably directs air-flow along the peripheral edge of the disc during drive operation when the cover is installed on the base plate.

17 Claims, 5 Drawing Sheets

TOP COVER SHROUD FOR A DISC DRIVE

RELATED APPLICATIONS

This application claims the priority of U.S. Provisional Patent Application Serial No. 60/158,847 entitled "DISC DRIVE SHROUD ATTACHMENT METHOD" filed Oct. 12, 1999.

FIELD OF THE INVENTION

This application relates to magnetic disc drives and more particularly to an improved disc drive assembly including a shroud feature and method of attaching the shroud feature.

BACKGROUND OF THE INVENTION

Disc drives are data storage devices that store digital data in magnetic form on a storage medium on a rotating information storage disc. Modern disc drives include one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided intro a plurality of separately addressable data sectors. The read/write transducer, e.g., a magneto resistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs. The radial position of the heads is controlled through the use of a voice coil motor (VCM) assembly positioned adjacent to the disc.

The rotation of the disc at high speeds during operation creates airflow adjacent the disc surfaces. When a large volume of air space is adjacent the rotating disc, this airflow is often turbulent. It is preferable that turbulence in the airflow be minimized. Turbulence can effect the radial and vertical positioning of the head over the center of the desired track, and can cause the disc to flutter undesirably.

To reduce the amount of turbulent airflow during operation of the disc, often an inner disc shroud is constructed in the base plate of the disc drive and by structural features on the base plate to define a minimal disc operation space. The shroud surrounds the disc such that the inner surface of the shroud is in close proximity to the outer peripheral surface of the disc around its circumference to reduce turbulence. It is preferable that the disc shroud enclose as much of the circumference of the outer peripheral surface of the disc as possible, without interfering with other components of the disc drive. However, it is often difficult to construct a base plate or structural features on the base plate that enclose as much of the circumference of the outer peripheral surface of the disc as possible while allowing for proper installation and operational clearances for the operational components in the disc drive. For example, a portion of the disc circumference is often left unshrouded for installation of the actuator. Additionally, openings in such a disc shroud are typically provided adjacent the actuator assembly to accommodate the voice coil motor (VCM), accommodate movement of the actuator and allow for proper installation and operational clearances for these components. These openings or gaps in the shroud, however, permit turbulence to develop when the disc is rotated.

SUMMARY OF THE INVENTION

Against this backdrop the present invention has been developed. The invention relates to a shroud feature and method for incorporating an airflow shroud feature in a disc drive assembly. The airflow shroud feature of the present invention is connected to the cover of the disc drive rather than the base plate. When the disc drive cover incorporating the shroud feature is placed on the disc drive, the shroud feature surrounds at least a portion of the circumference of the outer peripheral surface of the disc to reduce turbulence when the disc is operated.

In one preferred embodiment, the invention includes a disc drive having a base plate, and an information storage disc supported for rotation by a drive motor on, the base plate. The disc drive also has a top cover having a shroud rigidly connected to the top cover by engagement of the shroud with a feature of the top cover. The shroud operably directs air-flow along the peripheral edge of the disc during drive operation when the cover is installed on the base plate.

The invention can be implemented in accordance with another preferred embodiment as a cover for a disc drive. The cover includes a generally planar body shaped to cover a disc and an actuator assembly when mounted on the base plate, and a disc shroud connected to an underside surface of the generally planar body by engaging a feature on the generally planar body. The disc shroud extends from the underside of the generally planar body and around a portion of the disc when the cover is installed onto the base plate.

The invention can be implemented in accordance with another preferred embodiment as a method of connecting a disc shroud to a top cover of a disc drive. The method includes the steps of providing a feature in the top cover of the disc drive; and engaging a portion of the shroud with the feature in the top cover to connect the shroud to the cover in a position such that when the top cover is placed on a base plate of the disc drive, the shroud is positioned adjacent the outer peripheral edge of a disc. The shroud directs air-flow along the peripheral edge of the disc during drive operation.

These and various other features as well as advantages which characterize the present invention will be apparent from a reading of the following detailed description and a review of the associated drawings.

DETAILED DESCRIPTION

Figure 1:
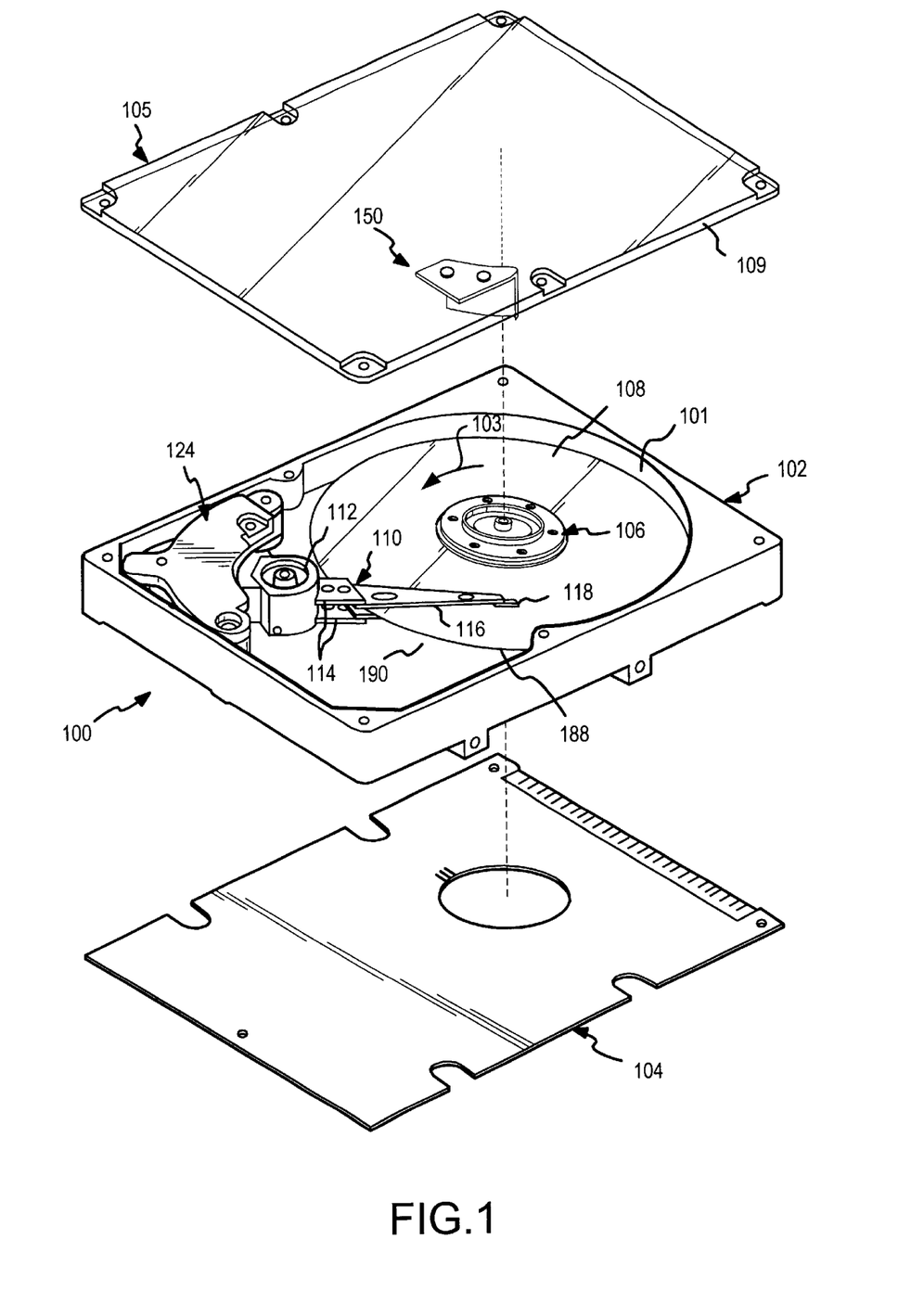
FIG. 1 is an exploded perspective view of a disc drive assembly including a transparent top cover incorporating a shroud feature in accordance with one embodiment of the invention.

A disc drive 100 and components thereof constructed in accordance with one embodiment of the present invention are shown in FIGS. 1–5. As shown in FIG. 1, the disc drive 100 includes a base plate 102 to which various components of the disc drive 100 are mounted. The base plate 102 defines an inner disc recess 101 that defines an inner disc space in which the disc operates. A top cover 105 (FIGS. 1 and 2) cooperates with the base 102 to form an internal, sealed environment for the internal components of the disc drive 100 in a conventional manner. The components include a disc drive motor 106 that rotates one or more information storage discs 108 within the disc recess shroud 101 at a constant high speed.

In operation, as the disc 108 spins, frictional forces impart a velocity to the boundary layer air surrounding the disc 108. This velocity propagates throughout the volume of air within the disc space, inducing a general positive profile airflow from the rotating disc in the direction of rotation of the disc 108, shown by directional arrow 103. To reduce turbulence and provide a more uniform air flow, preferably the peripheral wall of the disc recess 101 is constructed such that it is in close proximity to the outer peripheral surface 188 of the disc 108, and encloses as mulch of the circumference of the outer peripheral surface 188 of the disc 108 as possible, without interfering with other internal components of the disc drive 100.

Information is written to and read from recorded data arranged in circular tracks on the discs 108 through the use of read/write transducers or heads 118 carried by an actuator assembly 110 which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider (not shown) enabling the head 118 to fly in close proximity above the corresponding surface of the associated information storage disc 108 as a result of the airflow created by the spinning of the disc 108. The flying height of the heads 118 is preferably maintained as close to the disc 108 surface as possible. The flying height must be high enough so that turbulent airflow variations and shock events will not permit the heads to touch the surface. Additionally, turbulent airflow can cause undesirable vibrations in the disc or the head suspension system that can disrupt the heads ability to track the information on the disc. Therefore, less turbulent airflow is desirable for the accurate flying of the head 118.

The radial position of the heads 118 is controlled through the use of a voice coil motor (VCM) assembly 124, which typically includes a coil attached to the actuator assembly 110, as well as one or more permanent magnets that establish a magnetic field in which the coil is immersed. The controlled application of current to the coil causes magnetic interaction between the permanent magnets and the coil so that the coil moves in accordance with the well-known Lorentz relationship. As the coil moves, the actuator assembly 110 pivots about the bearing shaft assembly 112 and the heads 118 are caused to move across the surfaces of the discs 108. The disc drive 100 also includes a printed circuit board 104 mounted to the underside of the base plate 102.

The VCM assembly 124 and the actuator assembly 110 are located on and preferably fastened to the base plate 102 adjacent to the disc 108. Due to the close proximity of the VCM assembly 124 and the actuator assembly 110 to the disc 108, an opening or gap 190 in the disc shroud 101 is formed. Typically, such an opening 190 in the disc shroud 101 adjacent to the VCM assembly 124 and actuator assembly 110 permits proper installation and operation of the VCM assembly 124 and actuator assembly 110 over the disc 108. However, as discussed above, such an opening 190 in the disc shroud 101 can be undesirable because it permits the generation of turbulent airflow when the disc 108 is operated at high rates of speed.

The top cover 105 includes a generally planar shaped body 109 that has a vertically projecting shroud 150 connected thereto and extending downward from the underside surface of the top cover. When the top cover 105 is attached properly to the disc drive base 102, the shroud 150 extends vertically from the top cover 105 toward the base 102 in close proximity to the outer peripheral edge surface 188 of the disc 108, and fills at least a portion of the opening 190. In the embodiment shown, the shroud 150 is a generally L-shaped member that is rigidly connected to the top cover 105.

Figure 2:
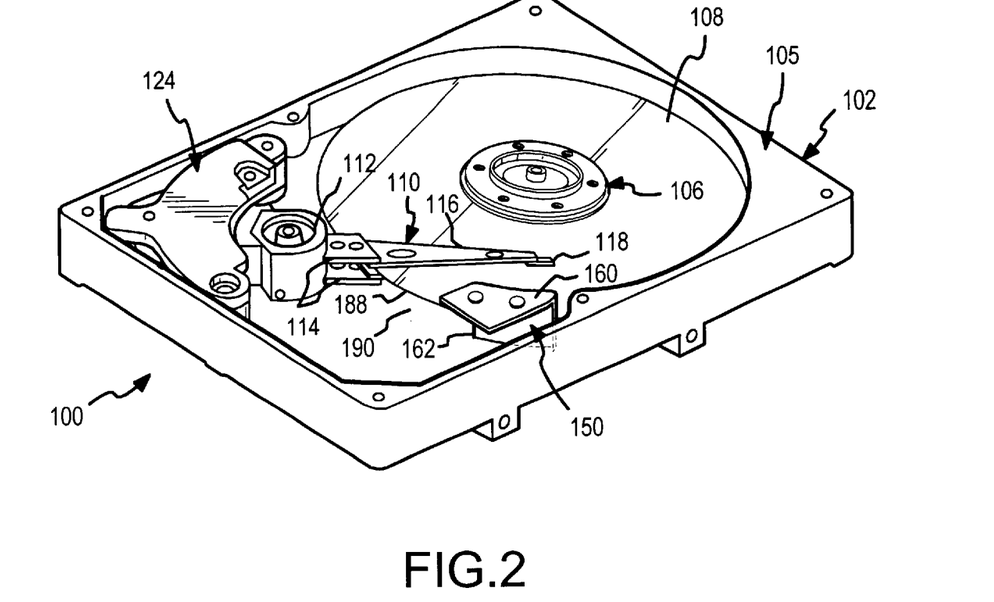
FIG. 2 is a perspective view of the disc drive assembly of FIG. 1, showing the transparent top cover incorporating the shroud feature attached to the disc drive.
Figure 3:
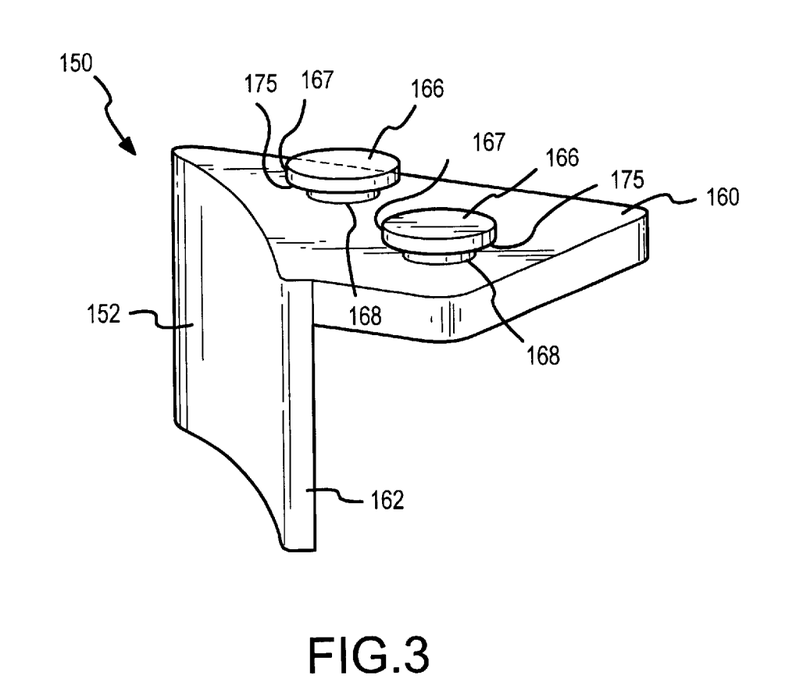
FIG. 3 is an enlarged perspective view of the shroud feature shown in FIGS. 1 and 2.

As shown in FIGS. 2 and 3, the shroud 150 includes a generally horizontally extending upper leg portion 160 and a generally vertically extending lower leg portion 162. The vertically extending lower leg portion 162 extends downwardly toward the base plate 102 adjacent the outer surface 188 of the disc 108. The lower leg portion 162 has an outer shroud surface 152 facing the disc 108. Preferably, the outer surface 152 of the shroud 150 is generally of a shape complimentary to the outer radius of the disc 108 such that it can be positioned in close proximity to the outer peripheral surface 188 of the disc 108. The shroud 150 acts as an additional shroud feature to that of the peripheral wall of the disc recess 101 to optimize laminar airflow within the disc space, and to reduce the amount of turbulence in the airflow. Generally, the closer the outer surface 152 is to the outer peripheral surface 188 of the disc 108, the greater retention of laminar airflow, and the greater the reduction in turbulence. Additionally, as the amount of the opening 190 that is filled by the shroud 150 increases, the retention of airflow and reduction in turbulence generally increase as well.

Those of skill in the art, and others, will recognize that the shroud 150 can be connected to the top cover 105 using a broad variety of methods. For example, an adhesive, such as a pressure sensitive adhesive, can be used to connect the upper surface of the horizontally extending upper leg portion 160 of the shroud 150 to the lower surface of the top cover 105. However, the use of pressure sensitive adhesives can add complexity and cost to the construction of the disc drive. Additionally, there is the possibility of out gassing from a pressure sensitive adhesive, which could cause problems with disc drive operation.

Figure 4:
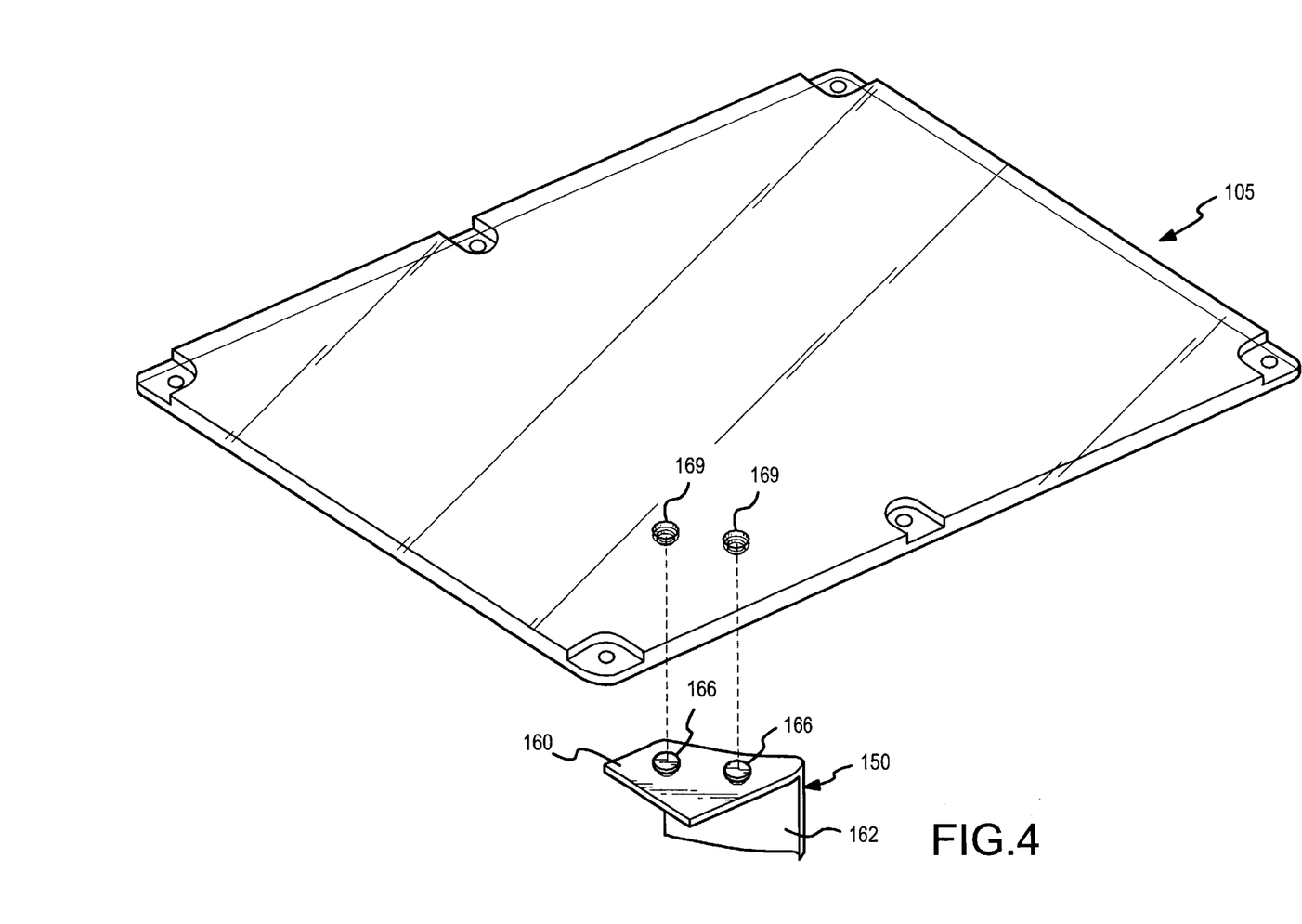
FIG. 4 is an enlarged exploded perspective view of the cover including the shroud feature shown in FIGS. 1 and 2.
Figure 5:
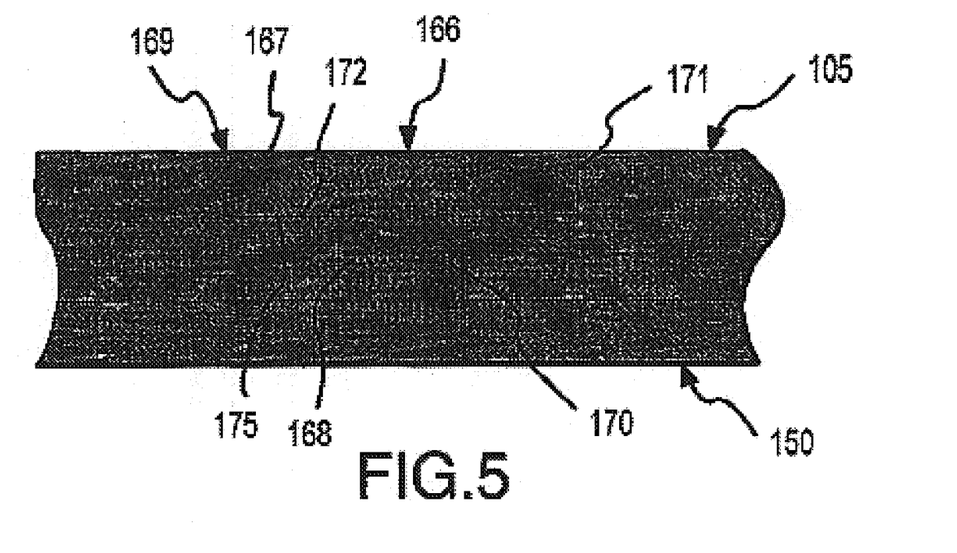
FIG. 5 is a partial cross-sectional view of the shroud feature and cover showing a protrusion of the shroud flange mating with an opening in the top cover for attachment of the shroud flange to the top cover.

Therefore, the inventors have developed other preferred structures and methods for connecting the shroud 150 to the top cover 105. The inventors have developed structures and methods of connecting the shroud 150 to the top cover 105 whereby the shroud 150 engages a feature on the top cover 105. Preferably, a physical feature on the shroud 150 engages a physical feature on the top cover 105. One such preferred embodiment is seen in FIGS. 3–5, wherein the shroud 150 is attached to the top cover 105 through the structural engagement of protrusions 166 on the shroud 150 with openings 169 in the top cover 105. Preferably, the protrusions 166 are lockably engaged with the top cover 105 through physical features in the openings 169 such that they cannot be removed.

The horizontally extending upper leg portion 160 of the shroud 150 includes protruding members 166. The protruding members 166 include a wider upper portion 167 and a narrower lower portion 168, which together form a shoulder 175. Furthermore, the top cover 105 includes a series of openings 169 defined therein that are sized and spaced apart to mate with the protruding members 166 on the shroud 150. As shown in FIG. 5, each of the openings 169 includes a narrow portion 170 adjacent the bottom surface of the top cover 105, and a wide portion 171 adjacent the top surface of the top cover 105. A shoulder 172 is defined in each opening where the narrow portion 170 and wide portion 171 meet. As seen in FIG. 5, the protruding members 166 fit within and mate with the openings 169 such that the wide portion 167 of the protruding member 166 mates with the wide portion 171 of the opening 169, and the narrow portion 168 of the protruding member 166 mates with the narrow portion 170 of the opening 169. The protruding members 166 are maintained in the opening 169 by engagement of the two shoulders 175 and 172. As such, the engagement of the protruding members 166 with in the openings 169 on the top cover 105 connects the shroud 150 to the top cover 105.

The shroud is preferably made of a moldable material, such as thermoplastic, and the structure used to connect the flange 150 to the top cover 105 is created using insert molding or heat staking techniques. The top cover 105 is preferably made of a rigid material having a melting point above that of the material used to make the shroud 150. The top cover 105 can be made of a metal material or sheet metal stamped into the desired shape.

For example, the shroud 150 can be formed through insert molding the shroud 150 onto the cover. During the molding process, the protruding members 166 on the shroud 150 are molded into the openings 169 on the top cover 105. Such an insert molding process is simply an injection molding process, where the top cover 105 including the openings 169 makes up a portion of the mold cavity. When the resin/melt is injected into the mold, the resin flows into the openings 169 in the top cover 105 to form the protrusions 166 of the shroud 150. When the mold is removed, the protrusions 166 molded into the openings 169 in the top cover 105 fasten the shroud 150 to the top cover 105.

In a heat staking method of attaching the shroud 150 to the top cover 105, for example, the shroud 150 is prefabricated with protrusions that have a diameter sized to fit through the narrow portion of the openings 169. The protrusions 166, inserted through the openings 169, each has an end portion that extends above the top surface of the top cover 105 when inserted into the openings 169. The end portions are then heated to melt, and spread the end portions down into the wide portions 171 of the openings 169, and fill the wide upper portion of the openings 169 as shown in FIG. 5. When the protrusions 166 cool, the structure rigidly connects the shroud 150 to the top cover 105.

Figure 6:
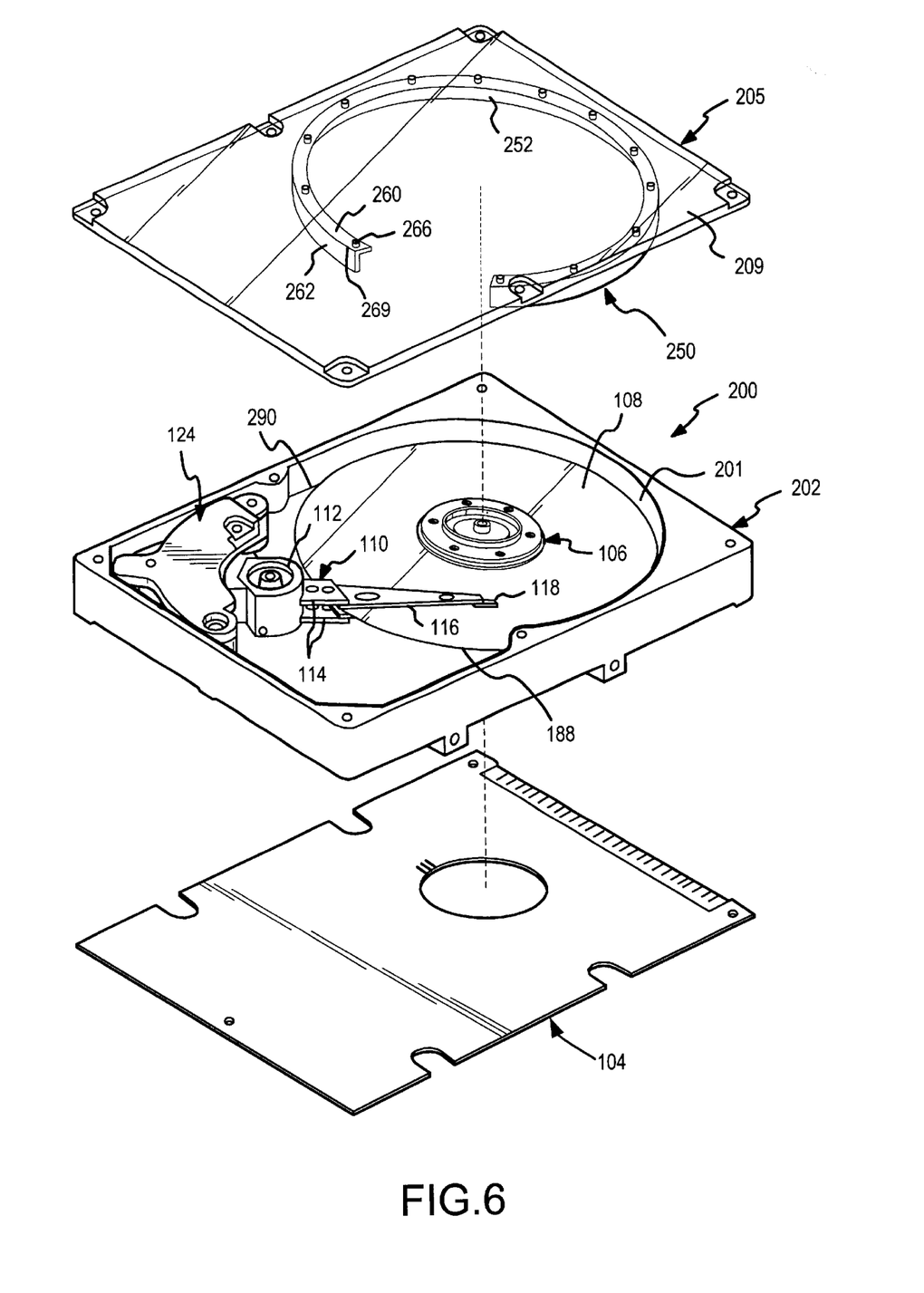
FIG. 6 is an exploded perspective view of another disc drive assembly including a top cover incorporating a shroud feature.

FIG. 6 shows another embodiment of a disc drive assembly 200 including a shroud 250 connected to the top cover 205 in accordance with the invention. The structure, components, and operation of the disc drive 200 are generally the same as those in the disc drive 100 discussed above, with like reference numerals used to describe like structure. The disc drive 200 includes a base plate 202, which defines an inner disc recess 201 in which the disc 108 operates. A top cover 205 is a generally planar shaped body 209 that cooperates with the base 202 to form an internal, sealed environment for the internal components of the disc drive 200 in a conventional manner. The components include a disc drive motor 106, an actuator assembly 110, and a VCM assembly 124, such as those described above.

However, in this embodiment, the disc recess 201 in the base plate 202 is constructed such that the outer wall of the recess 201 is not as close in proximity to the outer peripheral surface 188 of the disc 108 as in the first embodiment 100, and therefore a gap 290 is formed between the circumference of the outer peripheral surface 188 of the disc 108 and the disc recess 201. This gap 290 simplifies installation of components into the disc drive 200. However, the presence of the gap 290 can be undesirable because it permits the creation of turbulent airflow when the disc 108 is operated at high rates of speed.

The top cover 205 includes a vertically projecting shroud 250 fastened to the underside of the generally planar shaped body 209 of the top cover 205. When the top cover 205 is attached properly to the disc drive base plate 202, the shroud 250 extends vertically from the top cover toward the base plate 202 in close proximity to the outer peripheral surface 188 of the disc 108, and fills at least a portion of the gap 290. The shroud 250 includes a generally horizontally extending upper leg portion 260 and a generally vertically extending lower leg portion 262. The vertically extending lower leg portion 262 extends downwardly toward the base plate 202 adjacent the outer surface 188 of the disc 108. The lower leg portion 262 has an outer shroud surface 252 facing the disc. Preferably, the outer surface 252 of the shroud 250 is of a shape complementary to the outer radius of the disc 108 such that it can be positioned in close proximity to the outer peripheral surface 188 of the disc 108. The shroud 250 acts as a shroud feature to contain airflow within the disc space, and to reduce the amount of turbulence in the airflow. Generally, the closer the outer surface 252 is to the outer peripheral surface 188 of the disc 108, the greater retention of laminar airflow, and the greater the reduction in turbulence. Additionally, as the amount of the gap 290 that is filled by the shroud 250 increases, the retention of airflow and reduction in turbulence generally increase as well.

The shroud 250 is connected to the top plate 205 using the same general techniques as discussed above, with the shroud engaging a feature on the top cover. Preferably, protrusions 266 from the shroud 250 engage openings 269 in the top cover 205 to connect the shroud 250 to the top cover 205. The heat staking and insertion molding techniques discussed above are preferably used to connect the shroud to the top cover.

In summary, in one respect, the present invention may be viewed as a disc drive (such as 100 or 200) having a base plate (such as 102 or 202), an information storage disc (such as 108) supported for rotation by a drive motor (such as 106) on the base plate (such as 102 or 202), and a top cover (such as 105 or 205). The top cover (such as 105 or 205) has a shroud (such as 150 or 250) rigidly connected to the, top cover (such as 105 or 205) by engagement of the shroud with a feature of the top, cover. The shroud (such as 150 or 250) operably directs air-flow along the peripheral edge (such as 188) of the disc (such as 108) during drive operation when the cover (such as 105 or 205) is installed on the base plate (such as 102 or 202). In some embodiments, the shroud (such as 150 or 250) is connected to the top cover (such as 105 or 205) by engagement of a protrusion (such as 166 or 266) on the shroud within an opening (such as 169 or 269) in the top cover (such as 105 or 205). In some such embodiments, the protrusion (such as 166 or 266) is locked within the opening (such as 169 or 269) in the top cover (such as 105 or 205). The shroud (such as 150 or 250) can be, for example, heat staked or molded to the top cover. Preferably, an outer surface (such as 152 or 252) of the shroud (such as 150 or 250) is generally arcuate in shape complementary to the outer peripheral surface (such as 188) of the disc (such as 108). In some embodiments, the base plate (such as 102 or 202) includes a disc recess (such as 101 or 201) having an outer wall, and the outer wall includes an opening (such as 190) therein, and the shroud (such as 150 or 250) is positioned adjacent the outer peripheral edge (such as 188) of the disc (such as 108) in the opening (such as 190) in the outer wall. In other embodiments, the outer wall of the disc recess (such as 101 or 201) is spaced from the outer peripheral edge (such as 188) of the disc (such as 108) such that a gap (such as 290) is formed between the outer wall and the outer peripheral edge (such as 188) of the disc (such as 108), and the shroud (such as 150 or 250) is positioned adjacent the outer peripheral edge (such as 188) of the disc (such as 108) in the gap (such as 190).

In another respect, the present invention may be viewed as a cover (such as 105 or 205) for a disc drive (such as 100 or 200) having a base plate (such as 102 or 202), a disc (such as 108) rotatably supported by a spindle motor (such as 106) mounted to the base plate (such as 102 or 202), and an actuator assembly (such as 110) on the base plate (such as 102 or 202) adjacent the disc for moving a transducer (such as 118) over the disc (such as 188). The cover (such as 105 or 205) includes a generally planar body (such as 109 or 209) shaped to cover the disc and the actuator assembly when mounted on the base plate (such as 102 or 202). The cover (such as 105 or 205) further includes a disc shroud (such as 150 or 250) connected to an underside surface of the generally planar body (such as 109 or 209) by engaging a feature (such as 169 or 269) on the generally planar body (such as 109 or 209), wherein the disc shroud (such as 150 or 250) extends from the underside of the generally planar body (such as 109 or 209) and around a portion of the disc (such as 108) when the cover (such as 105 or 205) is installed onto the base plate (such as 102 or 202). In some embodiments, the shroud (such as 150 or 250) is connected to the underside of the generally planar body (such as 109 or 209) by engagement of a protrusion (such as 166 or 266) on the shroud (such as 150 or 250) within an opening (such as 169 or 269) in the underside of the generally planar body (such as 109 or 209). In some embodiments, the protrusion (such as 166 or 266) is locked within the opening (such as 169 or 269) in the underside of the generally planar body (such as 109 or 209). The shroud (such as 150 or 250) can be, for example, heat staked or molded to the underside of the generally planar body.

In another respect, the present invention may be viewed as a method of connecting a disc shroud (such as 150 or 250) to a top cover (such as 105 or 205) of a disc drive (such as 100 or 200), the disc drive including a base plate (such as 102 or 202), and an information storage disc (such as 108) supported for rotation by a drive motor (such as 106) on the base plate. The method includes providing a feature (such as 169 or 269) in the top cover (such as 105 or 205), and engaging a portion of the shroud (such as 166 or 169) with the feature (such as 169 or 269) in the top cover (such as 105 or 205) to connect the shroud (such as 150 or 250) to the cover in a position such that when the top cover is placed on the base plate (such as 102 or 202) of the disc drive, the shroud (such as 150 or 250) is positioned adjacent an outer peripheral edge (such as 188) of the disc 108. The shroud (such as 150 or 250) directs air-flow along the peripheral edge (such as 188) of the disc (such as 108) during drive operation. In some embodiments, the feature on the top cover (such as 105 or 205) comprises one or more openings (such as 169 or 269) in the top cover and the engaging step includes forming a portion (such as 166 or 266) of the shroud (such as 150 or 250) into the one or more openings (such as 169 or 269) on the top cover to connect the shroud to the cover. In some such embodiments, the forming step includes forming protrusions (such as 166 or 266) on the shroud (such as 150 or 250) into the openings (such as 169 or 269) on the top cover. The shroud (such as 150 or 250) can be, for example, heat staked or molded to the top cover (such as 105 or 205). In embodiments using molding techniques, preferably the molding is performed by insert molding the protrusions (such as 166 or 266) of the shroud (such as 150 or 250) into the openings (such as 169 or 269) in the top cover (such as 105 or 205).

It will be clear that the present invention is well adapted to attain the ends and advantages mentioned as well as those inherent therein. While presently preferred embodiments have been described for purposes of this disclosure, numerous changes may be made which will readily suggest them to those skilled in the art. For example, although the embodiments described above involve a single information storage disc, those of skill in the art, and others, will understand that the assemblies of the invention can be used in drives having a multiple disc stack.

As will also be understood by those of skill in the art, the structures used for connecting the shroud to the top cover may vary from those particularly shown. The physical feature or features on the top cover that engage the physical feature or features on the shroud may vary. For example, the openings could be on the shroud, and the protrusions could be on the top cover. Additionally, the structures used can vary, and can include structures such as hooks, latches, pins, holes, slots, grooves, gaps, seams, and other such structures that are configured and adapted to connect the top cover to the shroud.

Many other such modifications, changes and alternatives are also contemplated, and will be apparent to those of skill in the art. Accordingly, all such modifications, changes and alternatives are encompassed in the spirit of the invention disclosed and as defined in the appended claims.

What is claimed is:

1. A disc drive comprising:

a base plate;

an information storage disc supported for rotation by a drive motor on the base plate; and a top cover having a shroud rigidly connected to the top cover by engagement of a base portion of the shroud with a feature of the top cover, wherein the base portion extends along and across a portion of an underside surface of the top cover and wherein a portion of the shroud extends downward perpendicular from the base portion alongside a peripheral edge of the discs, the base portion extending away from the portion extending downward perpendicular from the base portion, wherein the portion extending downward operably directs air-flow along the peripheral edge of the disc during drive operation when the cover is installed on the base plate.

2. The disc drive assembly of claim 1, wherein the shroud is connected to the top cover by engagement of a protrusion on the shroud within an opening in the top cover.

3. The disc drive assembly of claim 2, wherein the protrusion is locked within the opening in the top cover.

4. The disc drive assembly of claim 1, wherein the shroud is heat staked to the top cover.

5. The disc drive assembly of claim 1, wherein the shroud is insert molded to the top cover.

6. The disc drive of claim 1, wherein an outer surface of the shroud is generally arcuate in shape complementary to the outer peripheral surface of the disc.

7. The disc drive of claim 1, wherein the base plate includes a disc recess having an outer wall, and the outer wall includes an opening therein, and the shroud is positioned adjacent the outer peripheral edge of the disc in the opening in the outer wall.

8. The disc drive of claim 1, wherein the base plate includes a disc recess having an outer wall that is spaced from the outer peripheral edge of the disc such that a gap is formed between the outer wall and the outer peripheral edge of the disc, and the shroud is positioned adjacent the outer peripheral edge of the disc in the gap.

9. A cover for a disc drive having a base plate, a disc rotatably supported by a spindle motor mounted to the base plate, and an actuator assembly on the base plate adjacent the disc for moving a transducer over the disc, the cover comprising:

a generally planar body shaped to cover the disc and the actuator assembly when mounted on the base plate; and a disc shroud connected to an underside surface of the generally planar body by engaging a feature on the generally planar body, wherein the disc shroud has a base portion extending along and across a portion of the underside surface and a shroud portion extending perpendicular to the base portion from the underside of the generally planar body, the base portion extending away from the shroud portion, wherein the shroud portion extends downward and around a portion of the disc when the cover is installed onto the base plate.

10. The cover of claim 9, wherein the shroud is connected to the underside of the generally planar body by engagement of a protrusion on the shroud within an opening in the underside of the generally planar body.

11. The cover of claim 10, wherein the protrusion is locked within the opening in the underside of the generally planar body.

12. The cover of claim 9, wherein the shroud is heat staked to the underside of the generally planar body.

13. The cover of claim 9, wherein the shroud is insert molded to the underside of the generally planar body.

14. A disc drive having a base plate and an information storage disc supported for rotation by a drive motor on the base plate, the disc having a peripheral edge, the drive comprising:

a top cover; and means extending from the top cover for directing rotation-induced air flow along the peripheral edge of the disc, wherein the means comprises a shroud fastened against an underside surface of the top cover, the shroud having a laterally extending flat support portion lying against the underside surface and a shroud portion extending perpendicularly from the support portion toward the base plate adjacent the peripheral edge of the disc, the flat support portion extending away from the shroud portion extending downward perpendicular from the flat support portion.

15. The disc drive according to claim 14 wherein the support portion lying against the underside surface is fastened to the top cover by a protrusion extending through an opening in the top cover.

16. The disc drive according to claim 15 wherein the protrusion has a head engaging a complementary shaped shoulder formed in the opening in the top cover.

17. A disc drive having a base plate and an information storage disc supported for rotation by a drive motor on the base plate, the disc having a peripheral edge, the drive comprising:

a top cover; and means extending from the top cover for directing rotation-induced air flow along the peripheral edge of the disc comprising a shroud fastened against an underside surface of the top cover, the shroud having a support portion lying against the underside surface and a shroud portion extending toward the base plate adjacent the disc, and wherein the shroud has an "L" shaped cross section and the shroud portion is curved and positioned parallel to the peripheral edge of the disc in the disc drive when the top cover is installed on the base plate.

* * * * *